United States Patent

[11] 3,552,554

| [72] | Inventor | Gunnar Olgard<br>Nynashamn, Sweden |
|---|---|---|
| [21] | Appl. No. | 857,759 |
| [22] | Filed | Sept. 15, 1969 |
| [45] | Patented | Jan. 5, 1971 |
| [73] | Assignee | Rederiaktiebolaget Nordstjernan |
| [32] | Priority | Sept. 20, 1968 |
| [33] | | Sweden |
| [31] | | No. 12705/68 |

[54] FLOW STABILIZING THROUGH LAMINAR SEPARATION APPARATUS
18 Claims, 5 Drawing Figs.

[52] U.S. Cl. .................................................. 210/519, 210/521
[51] Int. Cl. ...................................................... B01d 21/10, B01d 21/24
[50] Field of Search .......................................... 210/519, 521

[56] References Cited
UNITED STATES PATENTS
3,494,475   2/1970   Hedstrom et al. ............   210/521

*Primary Examiner*—J. L. DeCesare
*Attorney*—Davis, Hoxie, Faithfull & Hapgood

ABSTRACT: Apparatus for the continuous separation of material suspended in a liquid such as sewage or industrial waste of the type wherein the liquid passes down through a multiplicity of parallel, inclined units formed of parallel spaced inclined plates on which sediment deposits and then slides down as a layer with a layer of clarified liquid above it. Pockets attached to the underside of the plates receive the clarified liquid which is drawn off from them by discharge pipes at the bottom.

Vertical flow stabilization plates and also horizontal grids are provided in the inlet to said units to overcome cross flows and turbulences. In the sedimentation units, flow stabilization is accomplished by parallel spaced baffle plates extending in the direction of flow, and by transverse perforated plates in each unit to provide uniform suction across each unit, and by bypassing some clarified liquid with the sediment and recirculating it.

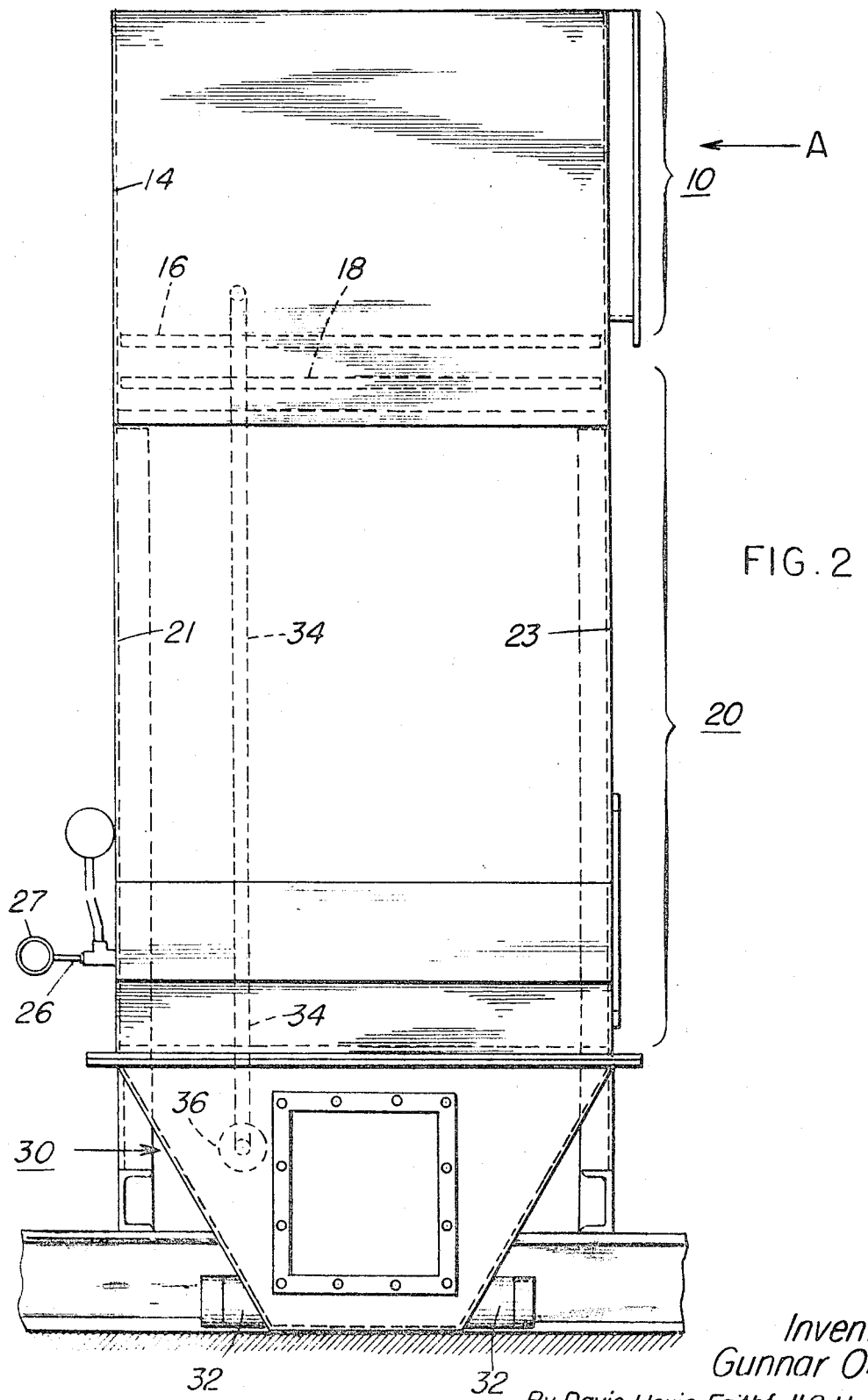

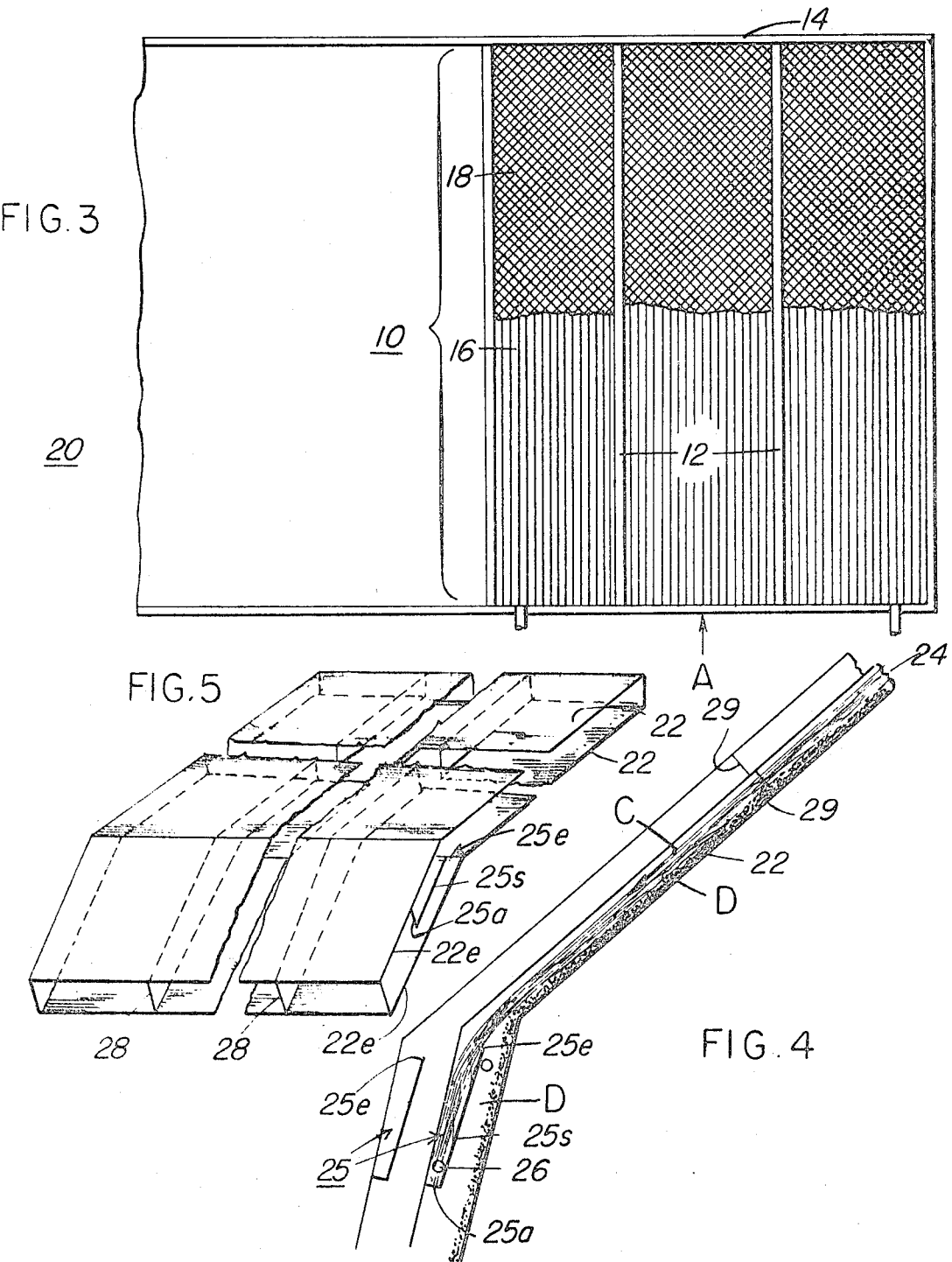

3,552,554

FLOW STABILIZING THROUGH LAMINAR SEPARATION APPARATUS

This invention relates to an apparatus for the continuous separation of material suspended in a liquid, either by sedimentation or flotation.

PRIOR ART

Separation apparatus having inclined plates over which flows the material which is to be treated has been known. The part of such apparatus in which the separation takes place, (herein called the separation part) comprises separation spaces separated by said plates (herein called basic units). In such apparatus the suspension enters at the lower end of the plates and thereafter flows upwards between the plates. The suspended material is deposited on the upper surface of the plates over which it slides downwardly under its own weight and is collected below their lower ends. The clarified liquid flows upwards and is discharged at the upper end of the basic unit. This known apparatus has the disadvantage that the clarified liquid flows oppositely to the sediment.

In a more recent design, the liquid to be treated enters at one end of the basic separation units, and the separation is carried out with the clarified liquid and sediment flowing in the same direction with outlets for the separated phase and the clarified liquid arranged separately at the outlet end. The transport in the sedimentation phase is facilitated by the concurrent flow, and the plates can be inclined to a degree most favorable for separation.

The separation effect was also improved in another type of apparatus, which is particularly adapted for suspensions wherein the suspended material has a density substantially equal to that of the liquid. In this apparatus at least one plate or passageway wall of the basic separation unit is movably mounted for extension of the basic separation unit in the direction of flow.

However, in methods thus far applied, the secondary flow phenomina, which may arise in laminar separation and which limit the capacity of the laminar separation apparatus, have not been understood or studied.

SUMMARY OF THE INVENTION

The present invention is based on thorough studies of the velocity distribution in the liquid flow through laminar separation apparatus. It has been discovered that laminar separation apparatus can be made smaller with satisfactory operation and a remarkable increase in capacity, by controlling secondary flow conditions.

The invention is applicable to laminar separation apparatus, particularly for separating material suspended in a liquid, comprising an inlet to a separation part which is assembled of basic separation units spaced apart by substantially plane plates mounted in spaced relationship and inclined in relation to the horizontal plane, and outlets for the resulting separated phase and the clarified liquid, respectively.

The invention is characterized by the provision of one or more flow stabilizing arrangements for preventing the development of, or eliminating the effect of, rotational flows or turbulences in the liquid stream during the separation and/or the discharge of the clarified liquid and the separated phase in their respective outlets.

The term substantially plane plates is to be understood to include, for example, the use of corrugated plates, and also plates which for strength reasons are slightly bent.

DETAILED DESCRIPTION OF THE INVENTION

In the drawings,

FIG. 2 is an end elevation view of the apparatus as seen from the left of FIG. 1;

FIG. 3 is a top plan view partly broken away of the apparatus of FIGS. 1 and 2;

FIG. 4 is a fragmentary vertical section view through the two right end units of FIG. 1 and the outside wall of apparatus;

FIG. 5 is a fragmentary perspective view of the right end unit of FIG. 1.

Figure 1:
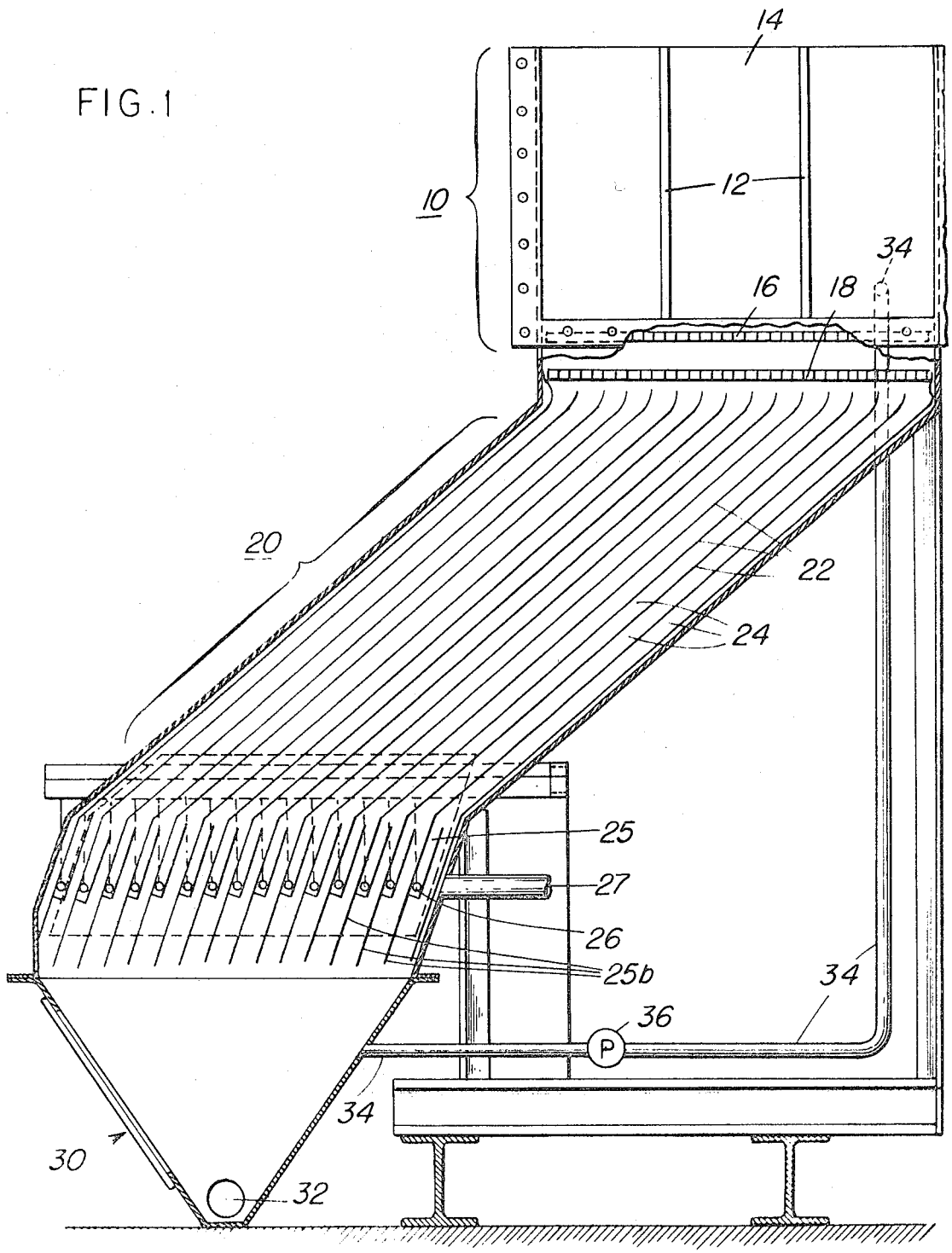
FIG. 1 is a cross-sectional view through laminar sedimentation apparatus.

Referring to the drawings the apparatus may be considered as having three main parts: an inlet chamber 10 at the top, a central sedimentation part 20, and an outlet part 30 at the bottom. The liquid to be treated enters through one side of the inlet chamber 10 of generally rectangular shape, flowing in the direction of the arrow A in FIG. 3, and travels downwardly into the sedimentation part 20 over inclined plates through a multiplicity of identical parallel sedimentation chambers wherein the liquid becomes separated by gravity into a sedimentation phase or sludge and clarified liquid. These are drained off separately at the bottom as they pass into the outlet part 30, as described in more detail below.

It has been discovered that in prior apparatus for the continuous treatment of liquids to separate out suspended material from the liquid, turbulence and secondary flows within the entering liquid have an adverse effect on the treatment in the sedimentation part because such secondary flows and turbulence tend to continue into the sedimentation part and to interfere with the separation and sedimentation actions.

Also turbulence and secondary flows in the sedimentation part itself may develop.

Furthermore, secondary flows and turbulence can develop in the separate outlets of the clarified liquid and the separated material, which detrimentally affect the smooth and regulated flow and functioning in the sedimentation part, particularly near the outlet end.

The decision as to where in the apparatus flow stabilizing arrangements are to be installed, is determined by the particular suspension and capacity requirements.

INLET PART OF THE APPARATUS

The suspension when being supplied to the inlet chamber 10 is readily subjected to rotations, commonly, in opposite directions substantially symmetrical about the center of flow. In order to prevent such rotations from propagating downwards into the sedimentation part 20, flow-straightening means may be provided, preferably, in the form of a plurality of vertical parallel guide plates 12, extending in the direction of flow from top to bottom of the chamber and from the entrance side to the opposite wall 14, thus dividing the inflowing liquid into a plurality of paths and reducing the possible area of secondary crossflows and turbulence. The number of flow-guide plates 12 may vary as necessary to reduce as much as desired the tendency toward turbulence and cross flows.

Whether or not the plates 12 are used, one or several parallel honeycomb grid structures 16 and 18 are provided between the inlet chamber 10 and the sedimentation part 20. These grids may be of various forms, such as rectangular, prismatic, hexagonal, octagonal or other shape as viewed in plan. The grids extend across the full area of the passage between the inlet chamber 10 and the sedimentation part 20. Their thickness or depth may vary greatly from an inch, in a typical use, depending on the amount of flow guidance and crossflow prevention needed. The grids may be the same or different and may abut one another or be spaced a short distance. Preferably, the lower grid 18 will be honeycombed and the upper grid 16 will consist of closely spaced parallel vertical plates strengthened by crosswebs or plates. When honeycomb grids are used both above and below, their interstices may be the same or of different sizes; but, preferably, the smaller interstices will be in the lower grid.

The velocity of the stream entering the inlet chamber, whatever its flow volume may be, should be sufficient to distribute the liquid over the whole horizontal area of the chamber. As a result of the action of the flow guide plates 12 and the grids 16 and 18, the liquid enters into the sedimentation part 20 flowing in a straight stream free of turbulence and crossflows.

THE SEDIMENTATION PART

The sedimentation part 20 comprises a multiplicity of identical long wide thin units created by the parallel positioning of plates 22 which extend across the entire width of the apparatus and are inclined at an angle of from 25° to approximately 45° from horizontal. In typical uses in treating, the plates are spaced from 1 inch to 3 inches apart depending on the liquid suspension being processed. The plates are supported at their side edges by the side walls 21, 23 of the sedimentation part. Between the plates 22, there are separate inclined passages 24 or compartments down which flows the suspension in parallel streams from the inlet chamber. During the flow, the nonliquid materials separate out from the liquid by gravitational action and sink to or deposit on the inclined plates forming sediment or sludge which slides downwardly on the surface of the plates. During this downward flow the clear liquid layer C forms on top of the sedimentary layer D.

In order to stabilize the flow rectilinearly through the sedimentation units one or preferably several baffles 28 are secured in any conventional manner in parallel spaced relation along the full length of the plates 22 oriented in the direction of liquid flow and perpendicular to the plates 22, as seen in FIG. 5. These baffles serve to prevent crossflows and rotation and overcome turbulence in the liquid. Also the baffles have a stiffening effect on the plates which can be made thinner, thus effecting a saving of material and enabling easier handling of the component parts during fabrication.

To separate the two layers, the lower ends 22e of the plates 22 are bent at an oblique angle to the main portion of the plates of approximately 60° from the horizontal; and a upwardly open pocket or box (designated generally by numeral 25) is formed by attaching an L-shaped plate structure to the under side of each of bent plate ends 22e, so that its open upper end is adjacent the bend of the plates 22. This structure may be formed with long leg 25s of the L-shaped plate structure extending across the whole width of the plate ends 22e between side walls 21 and 23 parallel to the ends 22e. The short leg 25a is of equal extent. The top edge 25e of plate 25s preferably lies in the plane of the neighboring plate 22 if extended, so that the top layer of clear liquid, flowing in the upper strata of passage 24 can flow directly into the top of the pocket 25 while the heavy sediment in the lower strata flows down the obliquely bent part 22e of the plate 22, and is separated from the clear liquid by the wall 25s acting as a partition. This dimensional relation is preferable when the clear layer of liquid is about one half and the sediment layer is about one half. If the thickness of the clear liquid layer increases, the edge of the pocket may have to be lowered and vice versa.

The clear liquid is drawn off from the bottom of each pocket 25 through a pipe 26. The pipes 26 from each of the pockets 25 connect with a common discharge pipe 27 which runs along one side of the apparatus.

Substantially the entire flow of clarified liquid goes into the pockets 25. After the clarified liquid is discharged into the pockets 25, the movement of the sediment would depend on gravity. Thus the bends in plates 22 and increased inclination of the end 22e enable increased gravitational action so that the sedimented phase D is not discharged too slowly, but still not so fast as to create turbulences. An angle of 60° from the horizontal has been found advantageous in many cases.

THE DISCHARGE PART

The sediment leaving the ends 25 of the plates is collected in an inverted frustopyramidal receptacle 30 attached to the bottom edges of the outside wall plate of the sedimentation part 20, from which the sediment is pumped out through a discharge pipe 32 connected to the bottom portion of the receptacle.

When the ends 22e of the plates 22 do not extend below pockets 25, a so-called parting turbulence may develop in the lower part of the sedimentation phase, in spite of the increased inclination of the ends 22e of the plate 22. Turbulence of this type may cause sediment to be conveyed into the pockets 25 with the clarified liquid. To prevent this, a flow stabilizing arrangement is provided which allows a small portion of the clarified liquid to flow outside past the clarified liquid pocket 25 with the sediment. This arrangement comprises a duct or pipe 34 which extends from the sediment receptacle 30 to the inlet chamber. A pump 36 is provided in this recirculation circuit to carry the liquid back to the inlet. The pipe from the sludge receptacle is connected thereto at a level higher than the sediment so as to draw off liquid and leave the sediment to be drawn off through its own discharge pipe 32 at the bottom.

The recirculation connection just described including pipe 34 and pump 36 is not used when the ends 22e of the plates 22 extend below pockets 25 as illustrated.

By the arrangement just described, the parting turbulence is transported down carrying the sediment with the bypassing liquid and the capacity of the apparatus is increased, despite the recirculation.

Another source of rotation and disturbance of the flow is effected by nonuniform suction of the clarified liquid from the outlets 26 individually. For this reason the units 25 are each provided with a perforated metal sheet 29 supported perpendicular therein and extending throughout the entire cross section of the unit, for the purpose of distributing the suction substantially uniformly across the entire cross section of the unit.

This occurs for the following reason. The pressure drop from the inlet down to the outlet pocket is generally very small. After the liquid has passed the perforated sheet and reaches the pockets 25, the pressure drop in the pocket 25 is also small. After passing through the perforated sheet the pressure drop is relatively high compared with the pressure drop in the area above. Therefore, if the suction pipe 26 exerts a lower pressure (greater suction) below the perforated sheet, the suction will be uniform for all the area of the perforated sheet, and the flow down to the outlet pocket will, therefore, also be uniform.

A suction device such as a pump of substantially constant flow drains the clarified liquid from the outlets 26 through their common discharge pipe 27. Instead of a suction device a difference of the inlet and outlet levels can be relied on to create suction in pipes 26.

Even if the suction is correctly adjusted with respect to the individual pockets 25, sediment deposits and pollution may be different in the different outlet passages, resulting in variations from time to time and place to place in suction in the individual outlet passages. This can cause underflow under the bottom edges of pockets 25 affecting the flow and sedimentation further back in the streams. To prevent this underflow, the bottom edges of the bent ends 22e of plates 22 should be extended into the sedimented phase in sludge receptacle 30 to such a depth that they are below the sediment as distinguished from the small amount of clarified liquid lying on top of the sediment. In that way an effective seal is formed preventing flow between adjacent units by reason of the higher density of the sediment. Under such circumstances the recirculation system 34, 36 previously described (and illustrated in FIG. 1) is not used.

The flow stabilization arrangements greatly increase the capacity and effectiveness of the apparatus. The examples disclosed can be used altogether or alone or in combinations of two or more.

Many modifications will occur to those skilled in the art. Therefore, the invention is not limited to the specific forms described.

I claim:

1. Apparatus for the continuous separation of material suspended in a liquid, comprising an inlet part into which the liquid to be treated is delivered; a separation part receiving said liquid from said inlet part, said separation part comprising a plurality of parallel similar units each having plate means inclined from horizontal, and takeoff means located adjacent the lower end of said plate means in position to take off clarified liquid while sediment deposits on the plate means and flows under said takeoff means; and a discharge part having receptacle means in which sediment from all said units is collected, and means to withdraw sediment from said receptacle means; in combination with flow stabilization means having a plurality of passages directing the liquid flow downwardly from said inlet part into said separation part in a multiplicity of individual passages preventing crossflow and turbulence.

2. Apparatus as claimed in claim 1 having means vertically dividing the horizontal liquid flow into and within said inlet part into a plurality of channels.

3. Apparatus as claimed in claim 1 wherein said flow stabilization means comprises honeycomb grid means having vertical passage ways to stabilize flow and prevent crossflow and turbulence of the liquid entering said separation part.

4. Apparatus as claimed in claim 2 wherein said flow stabilization means comprises honeycomb grid means having vertical passage ways, to stabilize flow and prevent crossflow and turbulence of the liquid entering said separation part.

5. Apparatus as claimed in claim 2 having means in each unit of the separation part dividing each unit into a plurality of passages extending in the direction of liquid flow to reduce crossflow and turbulence as the liquid passes through the units.

6. Apparatus as claimed in claim 5 having suction means connected to said clarified-liquid takeoff means to withdraw clarified liquid therefrom, and means in said individual units to regulate the suction in the individual takeoff means.

7. Apparatus as claimed in claim 6 having means to cause a fraction of the clarified liquid to pass said takeoff means to overcome parting turbulence adjacent the entrance to said takeoff means.

8. Apparatus as claimed in claim 6 having a connection from said discharge part above the level of sediment therein to said inlet part to cause a fraction of said clarified liquid to pass said takeoff means to overcome parting turbulence adjacent the entrance to said takeoff means, and means in said connection to move the passed-fraction of clarified liquid into said inlet portion.

9. Apparatus for the continuous separation of material suspended in a liquid, comprising an inlet part into which the liquid to be treated is delivered; a separation part receiving said liquid from said inlet part, said separation part comprising a plurality of parallel similar units each having plate means inclined from horizontal, and takeoff means located adjacent the lower end of said plate means in position to take off clarified liquid while sediment deposits on the plate means and flows under said takeoff means; and a discharge part having receptacle means in which sediment from all said units is collected, and means to withdraw sediment from said receptacle means; in combination with flow stabilization means in each unit of the separation part dividing each unit into a plurality of passages extending in the direction of liquid flow to reduce crossflow and turbulence as the liquid passes through the units.

10. Apparatus as claimed in claim 9 having suction means connected to said clarified liquid takeoff means to withdraw clarified liquid therefrom, and means in said individual units to regulate the suction in the individual units takeoff means.

11. Apparatus as claimed in claim 10 in which said suction regulating means comprises perforated plates in each unit transverse to the flow located along the length of said plate means.

12. Apparatus for the continuous separation of material suspended in a liquid, comprising an inlet part into which the liquid to be treated is delivered; a separation part receiving said liquid from said inlet part, said separation part comprising a plurality of parallel similar units each having plate means inclined form horizontal, and takeoff means located adjacent the lower end of said plate means in position to take off clarified liquid while sediment deposits on the plate means and flows under said takeoff means; and a discharge part having receptacle means in which sediment from all said units is collected, and means to withdraw sediment from said receptacle means; in combination with flow stabilization means in each unit of the separation part comprising means to cause a fraction of the clarified liquid to pass said takeoff means to overcome parting turbulence adjacent the entrance to said takeoff means.

13. Apparatus as claimed in claim 12 wherein parting turbulence overcoming means comprises a connection from said discharge part above the level of sediment therein to said inlet part, and means in said connection to move the passed-fraction of clarified liquid into said inlet portion.

14. Apparatus as claimed in claim 13 having suction means connected to said clarified liquid takeoff means to withdraw clarified liquid therefrom, an means in said individual units to regulate the suction in the individual takeoff means.

15. Apparatus as claimed in claim 14 in which said suction regulating means comprises perforated plates in each unit transverse to the flow located along the length of the units.

16. Apparatus for the continuous separation of material suspended in a liquid, comprising an inlet part into which the liquid to be treated is delivered; a separation part receiving said liquid from said inlet part, said separation part comprising a plurality of parallel similar units each having plate means inclined from horizontal, and receiving means located adjacent the lower end of said plate means in position to receive clarified liquid while sediment deposits on the plate means and flows under said receiving means, and means to draw off continuously the clarified liquid collected in said receiving means; and a discharge part having receptacle means in which sediment from all said units is collected, and means to withdraw sediment from said receptacle means; in combination with flow stabilization means having a plurality of passages directing the liquid flow downwardly from said inlet part into said separation part in a multiplicity of individual passages preventing crossflow and turbulence.

17. Apparatus for the continuous separation of material suspended in a liquid, comprising an inlet part into which the liquid to be treated is delivered; a separation part receiving said liquid from said inlet part, said separation part comprising a plurality of parallel similar units each having plate means inclined from horizontal, and receiving means located adjacent the lower end of said plate means in position to receive clarified liquid while sediment deposits on the plate means and flows under said receiving means; and means to draw off continuously the clarified liquid collected in said receiving means; and a discharge part having receptacle means in which sediment from all said units is collected, and means to withdraw sediment from said receptacle means; in combination with flow stabilization means in each unit of the separation part dividing each unit into a plurality of passages extending in the direction of liquid flow to reduce crossflow and turbulence as the liquid passes through the units.

18. Apparatus for the continuous separation of material suspended in a liquid, comprising an inlet part into which the liquid to be treated is delivered; a separation part receiving said liquid from said inlet part, said separation part comprising a plurality of parallel similar units each having plate means inclined from horizontal, and receiving means located adjacent the lower end of said plate means in position to receive clarified liquid while sediment deposits on the plate means and flows under said receiving means; and means to draw off continuously the clarified liquid collected in said receiving means; and a discharge part having receptacle means in which sediment from all said units is collected, and means to withdraw sediment from said receptacle means; in combination with flow stabilization means in each unit of the separation part comprising means to cause a fraction of the clarified liquid to pass said receiving means to overcome parting turbulence adjacent the entrance to said receiving means.